United States Patent
Sonoda et al.

(10) Patent No.: US 12,188,205 B2
(45) Date of Patent: Jan. 7, 2025

(54) CONTROL SYSTEM, METHOD OF CONTROLLING WORK VEHICLE, AND WORK VEHICLE

(71) Applicant: KOMATSU LTD., Tokyo (JP)

(72) Inventors: Takuya Sonoda, Tokyo (JP); Takeshi Kamimae, Tokyo (JP); Yukihisa Sakai, Tokyo (JP)

(73) Assignee: KOMATSU LTD., Tokyo (JP)

( * ) Notice: Subject to any disclaimer, the term of this patent is extended or adjusted under 35 U.S.C. 154(b) by 271 days.

(21) Appl. No.: 17/638,236

(22) PCT Filed: Jul. 7, 2020

(86) PCT No.: PCT/JP2020/026508
§ 371 (c)(1),
(2) Date: Feb. 25, 2022

(87) PCT Pub. No.: WO2021/065135
PCT Pub. Date: Apr. 8, 2021

(65) Prior Publication Data
US 2022/0298749 A1 Sep. 22, 2022

(30) Foreign Application Priority Data
Sep. 30, 2019 (JP) .............................. 2019-179568

(51) Int. Cl.
| | | |
|---|---|---|
| B62D 5/065 | (2006.01) | |
| B62D 6/00 | (2006.01) | |
| B62D 6/04 | (2006.01) | |
| B62D 11/06 | (2006.01) | |
| E02F 3/84 | (2006.01) | |
| E02F 9/20 | (2006.01) | |

(52) U.S. Cl.
CPC ............ *E02F 9/2087* (2013.01); *B62D 5/065* (2013.01); *B62D 6/00* (2013.01); *B62D 6/04* (2013.01); *B62D 11/06* (2013.01); *E02F 3/842* (2013.01); *E02F 9/2045* (2013.01); *E02F 3/841* (2013.01)

(58) Field of Classification Search
CPC . B62D 5/065; B62D 6/00; B62D 6/04; B62D 11/06; E02F 3/841; E02F 3/842; E02F 9/2045; E02F 9/2087
USPC ...................................................... 701/41, 42
See application file for complete search history.

(56) References Cited

U.S. PATENT DOCUMENTS

| | | | | |
|---|---|---|---|---|
| 6,434,462 B1* | 8/2002 | Bevly | .................... | G01S 19/39 |
| | | | | 172/3 |
| 2002/0072850 A1* | 6/2002 | McClure | ............. | A01B 69/008 |
| | | | | 701/25 |
| 2005/0288834 A1* | 12/2005 | Heiniger | ............. | G05D 1/0278 |
| | | | | 701/50 |

(Continued)

FOREIGN PATENT DOCUMENTS

| | | |
|---|---|---|
| CN | 101646885 A | 2/2010 |
| CN | 108297877 A | 7/2018 |

(Continued)

*Primary Examiner* — Erick R Solis
(74) *Attorney, Agent, or Firm* — Faegre Drinker Biddle & Reath LLP

(57) ABSTRACT

A motor grader representing a work vehicle includes a steering mechanism and a control unit. The control unit controls the steering mechanism to maintain constant, a rate of change in a direction of travel per unit travel distance of the motor grader.

15 Claims, 12 Drawing Sheets

(56) References Cited

U.S. PATENT DOCUMENTS

| | | | |
|---|---|---|---|
| 2007/0198158 A1* | 8/2007 | Ishibashi | B62D 11/183 |
| | | | 180/6.7 |
| 2008/0208461 A1 | 8/2008 | Gharsalli et al. | |
| 2010/0044060 A1 | 2/2010 | Shiohara et al. | |
| 2013/0080015 A1* | 3/2013 | Strothmann | B60L 15/2036 |
| | | | 701/72 |
| 2019/0047620 A1* | 2/2019 | Iwamura | E02F 3/841 |
| 2020/0031363 A1 | 1/2020 | Xiang et al. | |
| 2020/0200537 A1* | 6/2020 | Ceisel | E02F 9/265 |
| 2021/0010240 A1* | 1/2021 | Shoemaker | B62D 11/04 |
| 2021/0061374 A1* | 3/2021 | Hudson | B62D 21/186 |
| 2021/0122391 A1* | 4/2021 | Hanada | B60R 11/02 |

FOREIGN PATENT DOCUMENTS

| | | |
|---|---|---|
| JP | S53-115828 U | 9/1978 |
| JP | S64-054513 A | 3/1989 |
| JP | H01-319804 A | 12/1989 |
| JP | H07-172334 A | 7/1995 |
| JP | 2007-60982 A | 3/2007 |
| JP | 2013-201958 A | 10/2013 |
| JP | 2016-10336 A | 1/2016 |
| JP | 2018-69753 A | 5/2018 |

* cited by examiner

CONTROL SYSTEM, METHOD OF CONTROLLING WORK VEHICLE, AND WORK VEHICLE

TECHNICAL FIELD

The present disclosure relates to a control system, a method of controlling a work vehicle, and a work vehicle.

BACKGROUND ART

For example, US Patent Publication No. 2008/0208461 (PTL 1) discloses a motor grader including an automated steering system. The automated steering system includes a path generator configured to generate a path along which the vehicle can travel based on data on a position of a vehicle, a map of a work site, or a parameter representing a condition of travel of the vehicle and a path tracker configured to guide the vehicle along the path generated by the path generator.

CITATION LIST

Patent Literature

PTL 1: US Patent Publication No. 2008/0208461

SUMMARY OF INVENTION

Technical Problem

In the motor grader disclosed in PTL 1, with the use of the automated steering system, an attempt is made to lessen burden imposed on an operator who controls steering. The operator, however, has to enter various types of information necessary for generation of a travel path of a vehicle in advance into the path generator, and hence burden imposed on the operator has not sufficiently been lessened.

An object of the present disclosure is to provide a control system, a method of controlling a work vehicle, and a work vehicle that realize an operation assistance system with which burden imposed on an operator is sufficiently lessened.

Solution to Problem

A control system according to the present disclosure is a control system that controls a steering mechanism of a work vehicle. The control system includes a control unit. The control unit controls the steering mechanism of the work vehicle to maintain constant, a rate of change in a direction of travel per unit travel distance of the work vehicle.

A method of controlling a work vehicle according to the present disclosure is a method of controlling a work vehicle including a steering mechanism. The method of controlling a work vehicle includes calculating a rate of change in a direction of travel per unit travel distance of the work vehicle and controlling the steering mechanism to maintain constant, the calculated rate of change in the direction of travel per unit travel distance of the work vehicle.

A work vehicle according to the present disclosure includes a steering mechanism and a control unit. The control unit controls the steering mechanism to maintain constant, a rate of change in a direction of travel per unit travel distance of the work vehicle.

Advantageous Effects of Invention

According to the present disclosure, a control system, a method of controlling a work vehicle, and a work vehicle that realize an operation assistance system with which burden imposed on an operator is sufficiently lessened can be provided.

DESCRIPTION OF EMBODIMENTS

Figure 1:
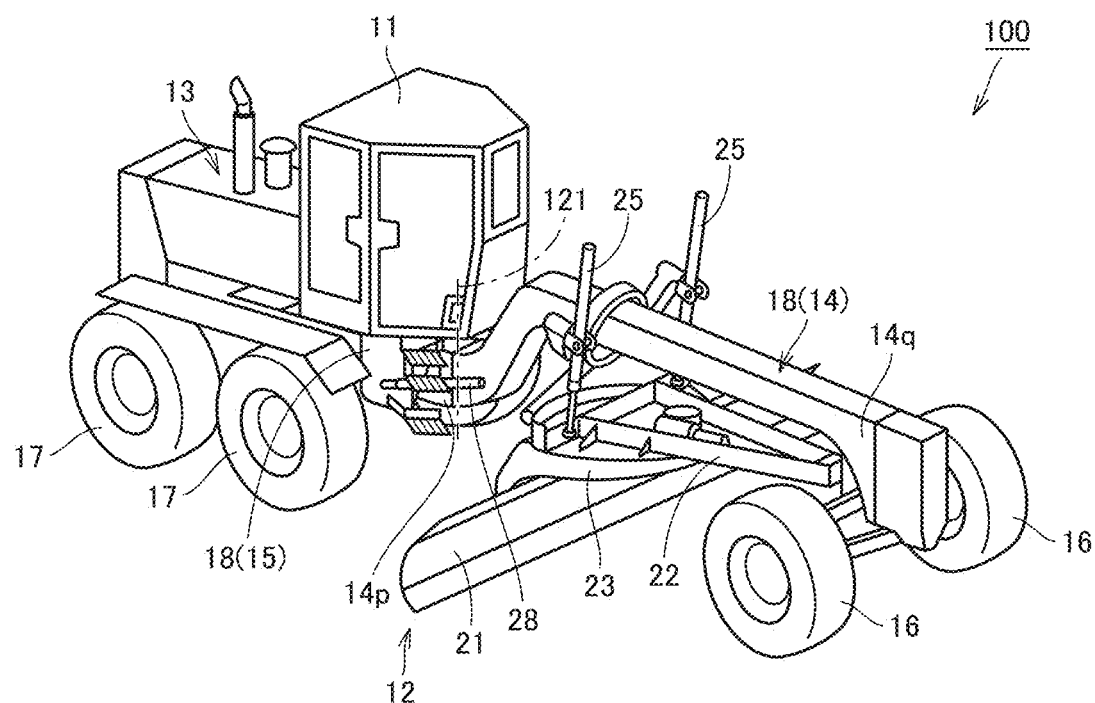
FIG. 1 is a perspective view showing a motor grader.

An embodiment of the present disclosure will be described with reference to the drawings. The same or corresponding members in the drawings referred to below have the same reference characters allotted.

First Embodiment

Figure 2:
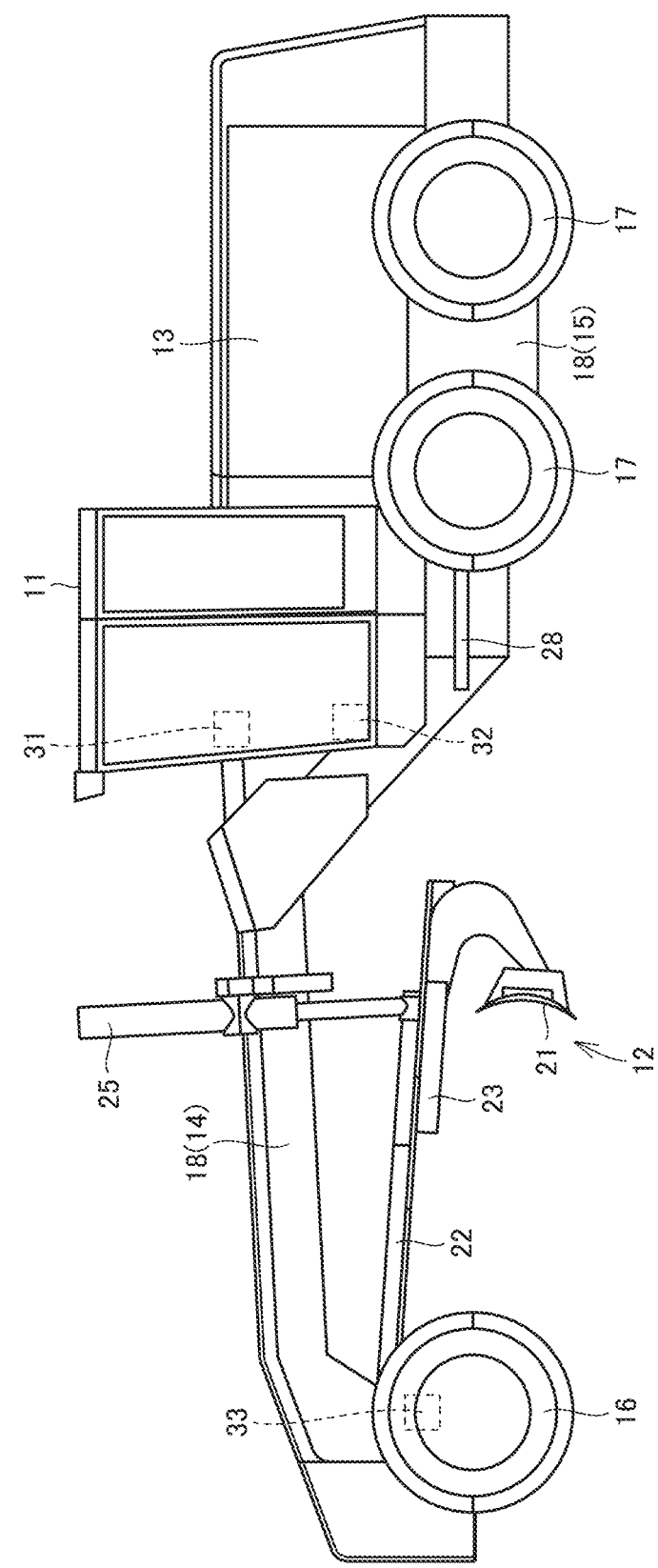
FIG. 2 is a side view showing the motor grader in FIG. 1.

FIG. 1 is a perspective view showing a motor grader. FIG. 2 is a side view showing the motor grader in FIG. 1.

As shown in FIGS. 1 and 2, a motor grader 100 is a work machine that carries out land grading works or snow removing works while it travels. Motor grader 100 includes a front frame 14, a rear frame 15, a pair of articulation cylinders 28, a cab 11 where an operator's seat is provided, an engine compartment 13, a front wheel 16 and a rear wheel 17, and a work implement 12.

In the description below, a fore/aft direction refers to a fore/aft direction of an operator who sits in an operator's seat in cab 11. A direction in which the operator sitting in the operator's seat faces is defined as the fore direction and a direction behind the operator sitting in the operator's seat is defined as the aft direction. A lateral direction refers to a lateral direction of the operator who sits in the operator's seat. A right side and a left side at the time when the operator sitting in the operator's seat faces front are defined as the right direction and the left direction, respectively. An upward/downward direction is a direction orthogonal to the plane including the fore/aft direction and the lateral direction. A side where the ground is located is defined as a lower side and a side where the sky is located is defined as an upper side.

Front frame 14 and rear frame 15 form a vehicular body frame 18 of motor grader 100. Front frame 14 is provided in front of rear frame 15.

Front frame 14 is pivotably connected to rear frame 15 around a pivot center 121. Front frame 14 is pivotably connected to rear frame 15 by a central pin (not shown) provided on an axis of pivot center 121. Pivot center 121 corresponds to an axis that extends in the upward/downward direction. Pivot center 121 is located in the center of motor grader 100 in the lateral direction.

Front frame 14 extends forward from pivot center 121. Front frame 14 includes a base end 14p pivotably coupled to rear frame 15 and a tip end 14q provided opposite to base end 14p. Rear frame 15 extends rearward from pivot center 121.

The pair of articulation cylinders 28 is provided on left and right sides with front frame 14 lying therebetween. Articulation cylinder 28 is a hydraulic cylinder that is driven to extend and retract by a hydraulic pressure. Articulation cylinder 28 has one end in a direction of extending and retracting pivotably coupled to front frame 14 and has the other end in the direction of extending and retracting pivotably coupled to rear frame 15. As articulation cylinder 28 is driven to extend and retract, front frame 14 pivots with respect to rear frame 15 around pivot center 121.

Cab 11 is carried on rear frame 15. Cab 11 delimits an indoor space which an operator enters. In cab 11, in addition to the operator's seat, a steering wheel 41 and a steering lever 42 (see FIG. 3 which will be described later) for a steering operation, a plurality of levers for operating work implement 12, and various displays are provided. Cab 11 may be carried on front frame 14.

Engine compartment 13 is provided in the rear of cab 11. Engine compartment 13 is supported by rear frame 15. An engine is accommodated in engine compartment 13.

Front wheel 16 and rear wheel 17 are running wheels. Front wheel 16 is rotatably attached to front frame 14. Front wheel 16 is steerably attached to front frame 14. Front wheel 16 laterally moves to vary an angle that it forms with respect to the fore/aft direction. Front wheel 16 is a steerable wheel. Rear wheel 17 is rotatably attached to rear frame 15. Driving force from the engine is transferred to rear wheel 17. Though FIG. 1 shows six running wheels in total including two front wheels 16, one on each side, and four rear wheels 17, two on each side, the number and arrangement of front wheels and rear wheels are not limited as such.

Work implement 12 is provided between front wheel 16 and rear wheel 17 in the fore/aft direction. Work implement 12 is supported by front frame 14. Work implement 12 includes a blade 21, a draw bar 22, a swing circle 23, and a pair of lift cylinders 25.

Draw bar 22 is provided below front frame 14. Draw bar 22 has a front end swingably coupled to tip end 14q of front frame 14. The pair of lift cylinders 25 is provided on left and right sides with front frame 14 lying therebetween. Draw bar 22 has a rear end supported by front frame 14 with the pair of lift cylinders 25 being interposed.

As the pair of lift cylinders 25 extends and retracts, the rear end of draw bar 22 can move upward and downward with respect to front frame 14. As the pair of lift cylinders 25 is each driven to retract, a height of blade 21 with respect to front frame 14 and front wheel 16 is adjusted upward. As the pair of lift cylinders 25 is each driven to extend, the height of blade 21 with respect to front frame 14 and front wheel 16 is adjusted downward.

Draw bar 22 is swingable upward and downward around an axis along the fore/aft direction by extending and retracting of the pair of lift cylinders 25 different from each other.

Swing circle 23 is provided below draw bar 22. Swing circle 23 is revolvably coupled to draw bar 22. Swing circle 23 is revolvable clockwise and counterclockwise around an axis along the upward/downward direction.

Blade 21 is provided below swing circle 23. Blade 21 is provided as being opposed to the ground. Blade 21 is supported by swing circle 23. With revolving motion of swing circle 23, blade 21 revolves to vary an angle (a blade propulsion angle) that it forms with respect to the fore/aft direction in a top view. An axis of revolution of blade 21 is an axis extending along the upward/downward direction.

Figure 3:
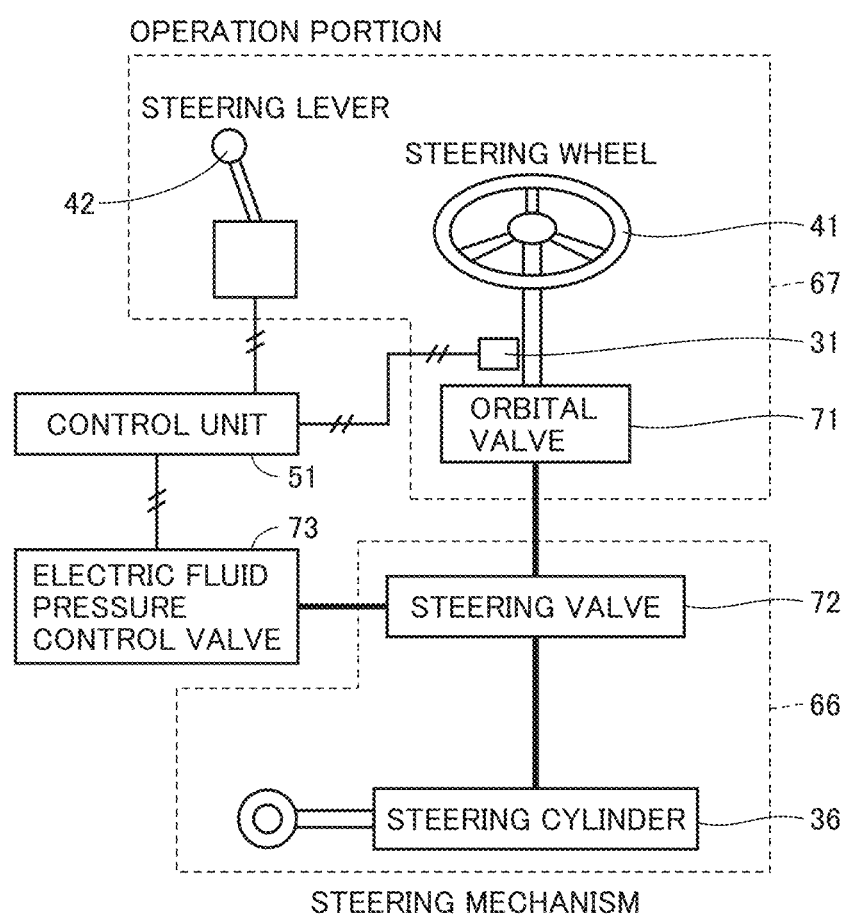
FIG. 3 is a system diagram showing a configuration involved with steering of the motor grader in FIG. 1.

FIG. 3 is a system diagram showing a configuration involved with steering of the motor grader in FIG. 1. As shown in FIG. 3, motor grader 100 further includes a steering mechanism 66, a control unit 51, and an operation portion 67.

Steering mechanism 66 is a mechanism that controls a direction of travel of motor grader 100. Control unit 51 controls steering of motor grader 100. Control unit 51 controls operations of steering mechanism 66. Operation portion 67 is provided in cab 11. Operation portion 67 is operated by an operator to move steering mechanism 66.

Operation portion 67 includes a steering wheel 41 and a steering lever 42. Steering wheel 41 is provided in front of the operator's seat in cab 11. Steering wheel 41 is, for example, a steering wheel in a shape of a wheel, and rotationally operated by an operator. Steering lever 42 is provided at a position distant from steering wheel 41.

Steering lever 42 is provided, for example, laterally to the operator's seat in cab 11. Steering lever 42 is tilted by the operator.

Motor grader 100 further includes an electric fluid pressure control valve 73. Operation portion 67 further includes an orbital valve 71. Steering mechanism 66 includes a steering valve 72 and a steering cylinder 36.

Electric fluid pressure control valve 73 supplies pressure oil to steering valve 72. Control unit 51 controls electric fluid pressure control valve 73 based on an operation signal from steering lever 42. Orbital valve 71 supplies pressure oil to steering valve 72 in accordance with a rotational operation onto steering wheel 41.

Steering valve 72 supplies pressure oil to steering cylinder 36. Steering valve 72 is controlled by pressure oil supplied from electric fluid pressure control valve 73 and orbital valve 71. With pressure oil from steering valve 72, steering cylinder 36 laterally moves front wheel 16 to vary an angle that it forms with respect to the fore/aft direction of front wheel 16. As front wheel 16 is leaned to the left, motor grader 100 revolves toward forward left along an arc. As front wheel 16 is leaned to the right, motor grader 100 revolves toward forward right along an arc.

According to such a configuration, as an operator operates steering wheel 41 or steering lever 42, steering cylinder 36 extends or retracts so that front wheel 16 laterally moves.

Figure 4:
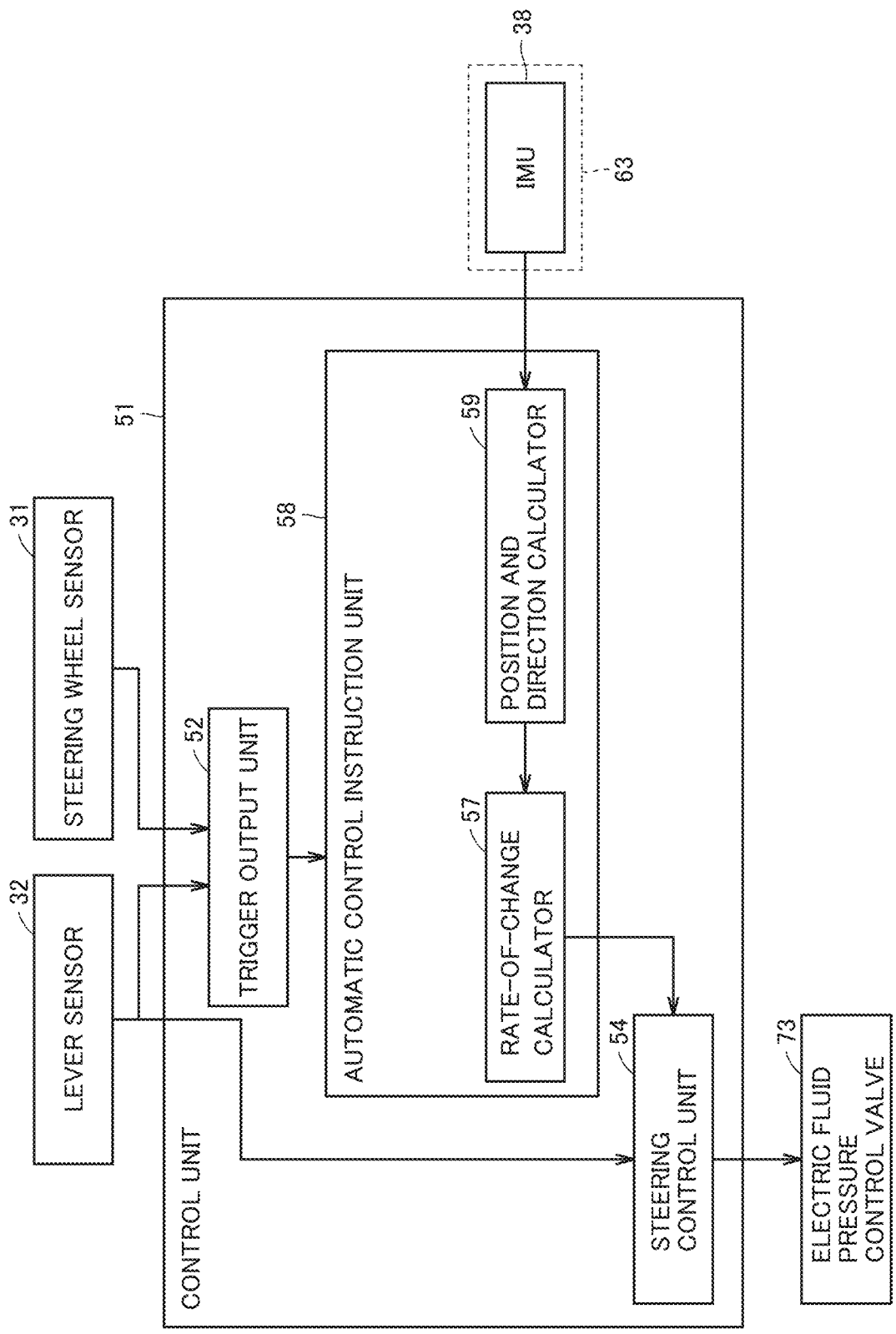
FIG. 4 is a block diagram showing a configuration involved with an operation assistance system of the motor grader in FIG. 1.

FIG. 4 is a block diagram showing a configuration involved with an operation assistance system of the motor grader in FIG. 1. As shown in FIGS. 2 to 4, control unit 51 controls operations of the operation assistance system of motor grader 100 which will be described below.

Motor grader 100 further includes a steering wheel sensor 31 and a lever sensor 32. Steering wheel sensor 31 senses an operation onto steering wheel 41. Lever sensor 32 senses an operation onto steering lever 42.

Steering wheel sensor 31 generates an operation signal when it senses an operation onto steering wheel 41 by an operator and provides the operation signal to control unit 51. Steering wheel sensor 31 is, for example, a shaft displacement sensor that detects displacement of an angle of a steering wheel shaft caused by rotation of steering wheel 41. Lever sensor 32 generates an operation signal when it senses an operation onto steering lever 42 by the operator and provides the operation signal to control unit 51. Lever sensor 32 is, for example, a position sensor that detects an angular position of steering lever 42.

Steering wheel sensor 31 may have a dead zone so as not to generate an operation signal when an amount of rotational operation of steering wheel 41 is small. Similarly, lever sensor 32 may have a dead zone so as not to generate an operation signal when an amount of operation to tilt steering lever 42 is small. By way of example, an amount of operation onto steering wheel 41 or steering lever 42 at the time when a steering angle of front wheel 16 which will be described later is varied within a range of ±0.5° is determined as being small.

Motor grader 100 includes a sensing unit 63. Sensing unit 63 senses information on at least any one of a position and an orientation of motor grader 100.

Sensing unit 63 includes an inertial measurement unit (IMU) 38. IMU 38 is a sensor that measures an acceleration and an angular velocity of motor grader 100. IMU 38 provides a signal indicating the acceleration and the angular velocity of motor grader 100 to control unit 51.

As shown in FIG. 4, control unit 51 controls steering mechanism 66 to maintain constant, a rate of change in a direction of travel per unit travel distance of motor grader 100 when a trigger for starting automatic control of steering mechanism 66 is provided.

Control unit 51 starts control of steering mechanism 66 when an operation onto operation portion 67 is stopped. Control unit 51 stops control of steering mechanism 66 when an operation onto operation portion 67 is resumed.

Control unit 51 includes a trigger output unit 52, an automatic control instruction unit 58, and a steering control unit 54.

Trigger output unit 52 provides a trigger for starting or stopping control (automatic steering control which will be described later) of steering mechanism 66 based on a steering wheel 41 operation signal from steering wheel sensor 31 and/or a steering lever 42 operation signal from lever sensor 32.

Trigger output unit 52 provides a trigger for stopping automatic steering control (a stop trigger which will be described later) when the steering wheel 41 operation signal from steering wheel sensor 31 or the steering lever 42 operation signal from lever sensor 32 is provided.

Trigger output unit 52 provides a trigger for starting automatic steering control (a start trigger which will be described later) when the steering wheel 41 operation signal from steering wheel sensor 31 and the steering lever 42 operation signal from lever sensor 32 are not provided.

Automatic control instruction unit 58 includes a position and direction calculator 59 and a rate-of-change-in-travel-direction calculator 57.

Position and direction calculator 59 receives input of a signal indicating an acceleration and an angular velocity of motor grader 100 sensed by IMU 38. Position and direction calculator 59 calculates a position and an orientation of motor grader 100 based on the acceleration and the angular velocity of motor grader 100 measured by IMU 38 and provides a signal indicating the calculated position and orientation of motor grader 100 to rate-of-change calculator 57.

Rate-of-change calculator 57 receives input of the signal indicating the position and the orientation of motor grader 100 calculated by position and direction calculator 59. Rate-of-change calculator 57 calculates a rate of change in the direction of travel per unit travel distance of motor grader 100 based on the position and the orientation of motor grader 100 calculated by position and direction calculator 59.

Steering control unit 54 controls steering mechanism 66 to maintain constant, the rate of change in the direction of travel per unit travel distance of motor grader 100 calculated by rate-of-change calculator 57. Specifically, steering control unit 54 provides a control signal to electric fluid pressure control valve 73 to maintain constant, the rate of change in the direction of travel per unit travel distance of motor grader 100 calculated by rate-of-change calculator 57. Electric fluid pressure control valve 73 supplies pressure oil to steering valve 72 and controls steering cylinder 36 based on a signal from steering control unit 54 (start of automatic steering control).

When an operation onto operation portion 67 by the operator is resumed, trigger output unit 52 receives input of the steering wheel 41 operation signal from steering wheel sensor 31 or the steering lever 42 operation signal from lever sensor 32. Trigger output unit 52 thus provides a stop trigger. In this case, automatic control instruction unit 58 receives the stop trigger from trigger output unit 52 and stops automatic steering control.

Figure 5:
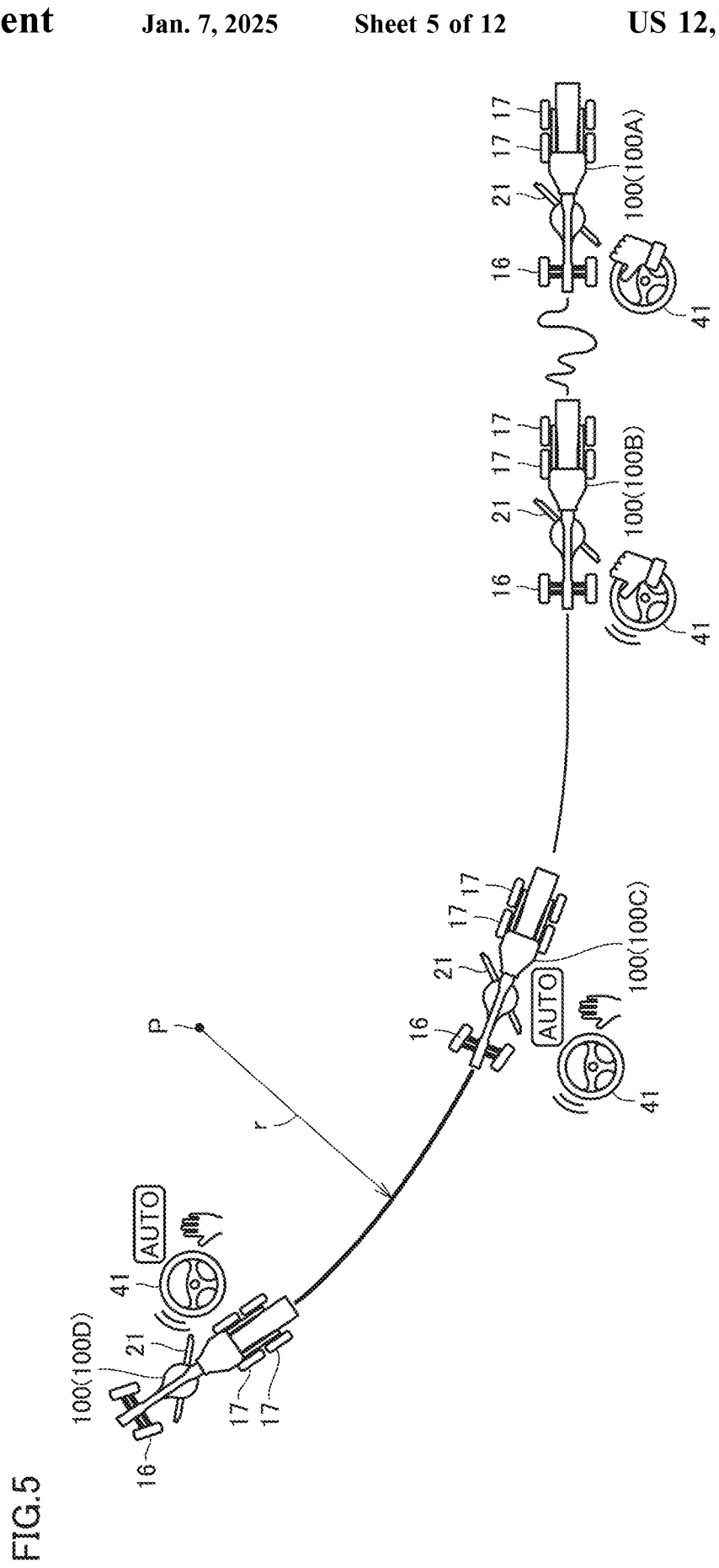
FIG. 5 is a top view schematically showing the motor grader, automatic steering control of which is started in revolution.

In succession, automatic steering control carried out by control unit 51 will more specifically be described. FIG. 5 is a top view schematically showing the motor grader, automatic steering control of which is started in revolution.

For the sake of brevity of description, FIG. 5 and FIG. 6 which will be described later show an example in which only steering wheel 41 is used as operation portion 67 for moving front wheel 16.

As shown in FIGS. 4 and 5, motor grader 100 travels to sequentially move to positions shown with a motor grader 100A, a motor grader 100B, a motor grader 100C, and a motor grader 100D (which are referred to as a "position 100A", a "position 100B", a "position 100C", and a "position 100D", respectively below).

While motor grader 100 moves from position 100A to position 100B, the operator has motor grader 100 travel by operating steering wheel 41. During this period, trigger output unit 52 receives input of the steering wheel 41 operation signal from steering wheel sensor 31. Trigger output unit 52 provides the stop trigger. Automatic control instruction unit 58 receives the stop trigger from trigger output unit 52 and automatic steering control is not started.

While motor grader 100 moves from position 100B to position 100C, the operator has motor grader 100 revolve toward front right by operating steering wheel 41. During this period, trigger output unit 52 receives input of the steering wheel 41 operation signal from steering wheel sensor 31. Trigger output unit 52 provides the stop trigger. Automatic control instruction unit 58 receives the stop trigger from trigger output unit 52 and automatic steering control is not started.

While motor grader 100 moves from position 100C to position 100D, the operator does not operate steering wheel 41. During this period, trigger output unit 52 does not receive the steering wheel 41 operation signal from steering wheel sensor 31. Trigger output unit 52 provides the start trigger. Automatic control instruction unit 58 receives the start trigger from trigger output unit 52 and automatic steering control is started.

In the absence of input of the steering wheel 41 operation signal from steering wheel sensor 31 to trigger output unit 52, trigger output unit 52 provides the start trigger. Position and direction calculator 59 calculates the position and the orientation of motor grader 100 based on the acceleration and the angular velocity of motor grader 100 measured by IMU 38 and provides the position and the orientation to rate-of-change calculator 57. Rate-of-change calculator 57 calculates the rate of change in the direction of travel per unit travel distance of motor grader 100 based on the position and the orientation of motor grader 100 calculated by position and direction calculator 59. The rate of change in the direction of travel per unit travel distance of motor grader 100 refers to an amount of change (angle) in orientation (for example, a direction corresponding to the front of motor grader 100) of motor grader 100 each time motor grader 100 travels over a unit travel distance (for example, 1 m).

During automatic steering control from position 100C to position 100D, steering control unit 54 controls steering cylinder 36 such that the amount of change in orientation of motor grader 100 each time motor grader 100 travels over the unit travel distance is set to a constant angle. Motor grader 100 moves as revolving while it maintains a constant radius of curvature r under automatic steering control by steering control unit 54.

Thereafter, when trigger output unit 52 receives input of the steering wheel 41 operation signal from steering wheel sensor 31, steering control unit 54 stops automatic steering control, and in the absence of input of the steering wheel 41 operation signal from steering wheel sensor 31 to trigger output unit 52, steering control unit 54 resumes automatic steering control.

Figure 6:
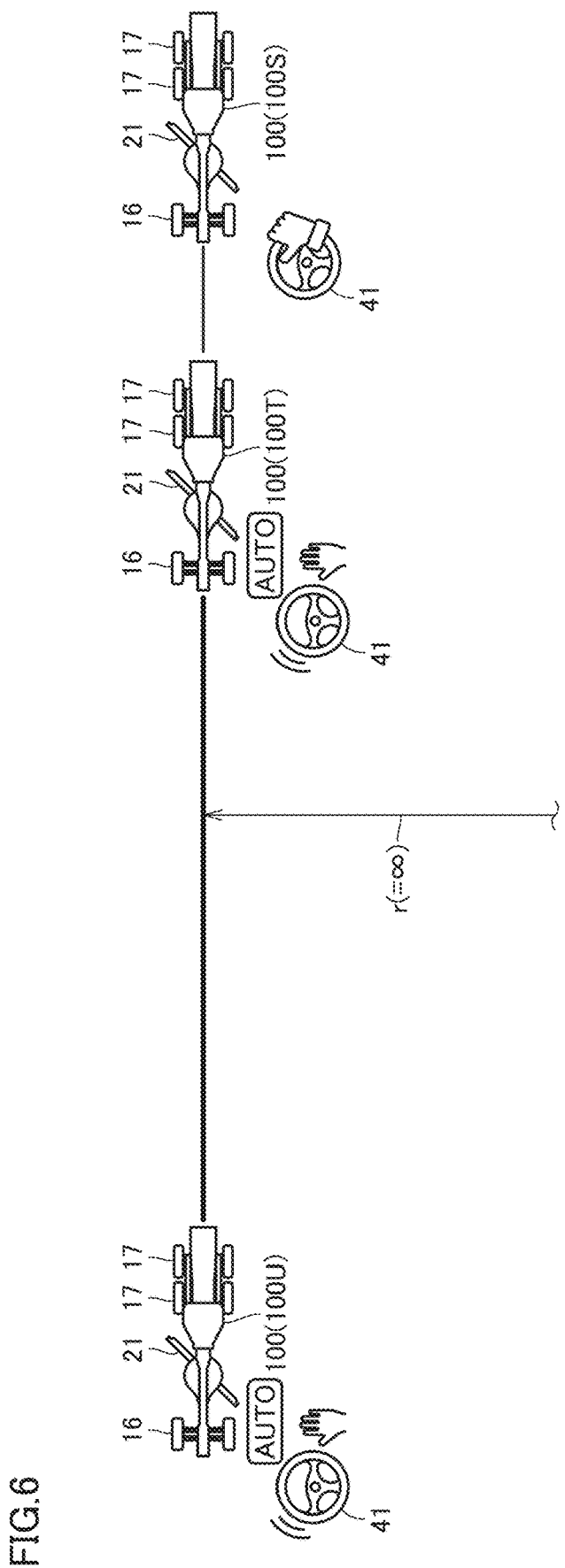
FIG. 6 is a top view schematically showing the motor grader, automatic steering control of which is started in linear travel.

FIG. 6 is a top view schematically showing the motor grader, automatic steering control of which is started in linear travel.

As shown in FIG. 6, motor grader 100 travels to sequentially move to positions shown with a motor grader 100S, a motor grader 100T, and a motor grader 100U (which are referred to as a "position 100S", a "position 100T", and a "position 100U", respectively below).

While motor grader 100 moves from position 100S to position 100T, the operator has motor grader 100 travel by operating steering wheel 41. During this period, trigger output unit 52 receives input of the steering wheel 41 operation signal from steering wheel sensor 31. Trigger output unit 52 provides the stop trigger. Automatic control instruction unit 58 receives the stop trigger from trigger output unit 52 and automatic steering control is not started.

While motor grader 100 moves from position 100T to position 100U, the operator does not operate steering wheel 41. During this period, trigger output unit 52 does not receive the steering wheel 41 operation signal from steering wheel sensor 31. Trigger output unit 52 provides the start trigger. Automatic control instruction unit 58 receives the start trigger from trigger output unit 52 and automatic steering control is started.

During automatic steering control from position 100T to position 100U, steering control unit 54 controls steering cylinder 36 to set to zero, the amount of change in orientation of motor grader 100 each time motor grader 100 travels over the unit travel distance. Motor grader 100 moves straight under automatic steering control by steering control unit 54.

Figure 7:
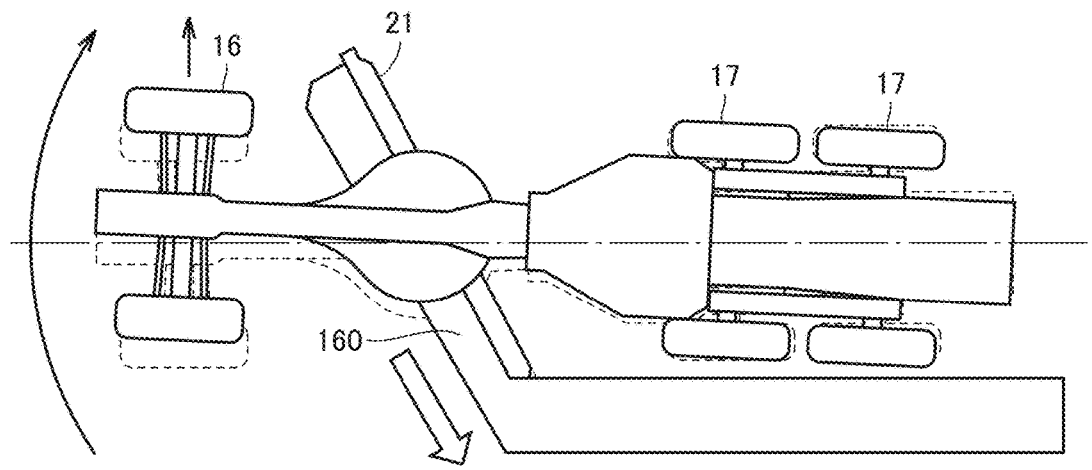
FIG. 7 is a top view showing a behavior of the motor grader when load is applied to a blade.

FIG. 7 is a top view showing a behavior of the motor grader when load is applied to the blade. As shown in FIG. 7, in order to move deposits 160 such as soil or snow sideways, blade 21 is used as being obliquely tilted with respect to the lateral direction. In this case, as blade 21 receives load from deposits 160, the direction of travel of motor grader 100 is displaced sideways, or motor grader 100 wanders laterally due to variation in load applied by deposits 160. Without being limited to motor grader 100, a work vehicle generally travels on the ground with surface irregularities, and hence the direction of travel of the work vehicle tends to be displaced.

Therefore, the operator should operate also a control lever of work implement 12 while the operator operates steering wheel 41 or steering lever 42 or performs a leaning operation in order to adjust the direction of travel of motor grader 100. Since such operations require advanced techniques and concentration, excessive burden is imposed on the operator.

In contrast, in motor grader 100, when a trigger for starting automatic steering control is provided to automatic control instruction unit 58, steering control unit 54 carries out automatic steering control to maintain constant, the rate of change in the direction of travel per unit travel distance of motor grader 100.

According to such a configuration, the operator can concentrate on operations of work implement 12 without performing an operation for adjusting the direction of travel of motor grader 100 during automatic steering control. Since automatic steering control is automatically carried out throughout calculation of the rate of change in the direction of travel per unit travel distance of motor grader 100, the operator does not have to provide in advance, input of a map of a work site or various parameters relating to a travel path. Therefore, the operation assistance system with which burden on the operator is sufficiently lessened can be realized.

Control unit 51 starts automatic steering control when the operation onto steering wheel 41 and steering lever 42 is stopped. According to such a configuration, the operator does not have to perform a special operation for starting automatic steering control, and hence burden on the operator can further be lessened.

When the operation onto steering wheel 41 or steering lever 42 is resumed, control unit 51 stops automatic steering control. According to such a configuration, the operator can have motor grader 100 travel in an intended direction through the operation onto steering wheel 41 or steering lever 42.

Figure 8:
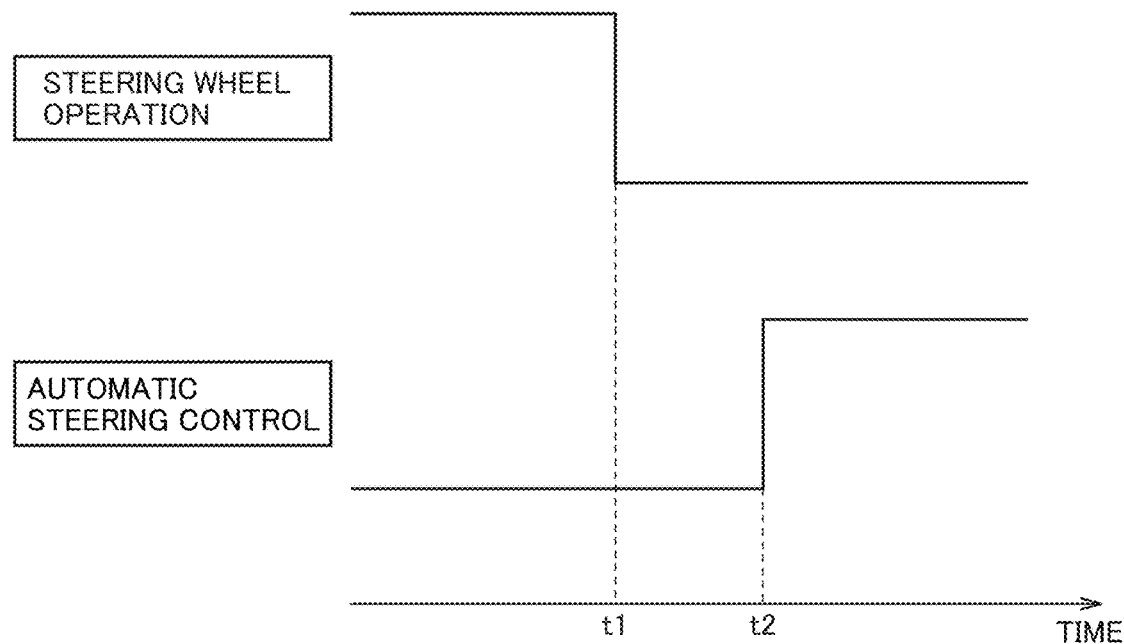
FIG. 8 is a timing chart showing relation between timing of an operation onto a steering wheel and timing of automatic steering control.

FIG. 8 is a timing chart showing relation between timing of an operation onto the steering wheel and timing of automatic steering control.

As shown in FIGS. 4 and 8, control unit 51 may start automatic steering control after a state in which the operation onto steering wheel 41 and steering lever 42 is stopped continues for a prescribed period.

In the timing chart shown in FIG. 8, at time t1, the operator does not perform an operation onto steering wheel 41, so that trigger output unit 52 does not receive input of the steering wheel 41 operation signal from steering wheel sensor 31. Then, at time t2, steering control unit 54 starts automatic steering control.

An interval from time t1 to time t2 is, for example, within a range not shorter than 1 s and not longer than 2 s (1 s≤(t2−t1)≤2 s).

According to such a configuration, automatic steering control is started after the state in which the operation onto steering wheel 41 and steering lever 42 is stopped continues for a prescribed period. Therefore, control unit 51 can be prevented from overacting to stop of the operation onto steering wheel 41 and steering lever 42 and starting automatic steering control.

Figure 9:
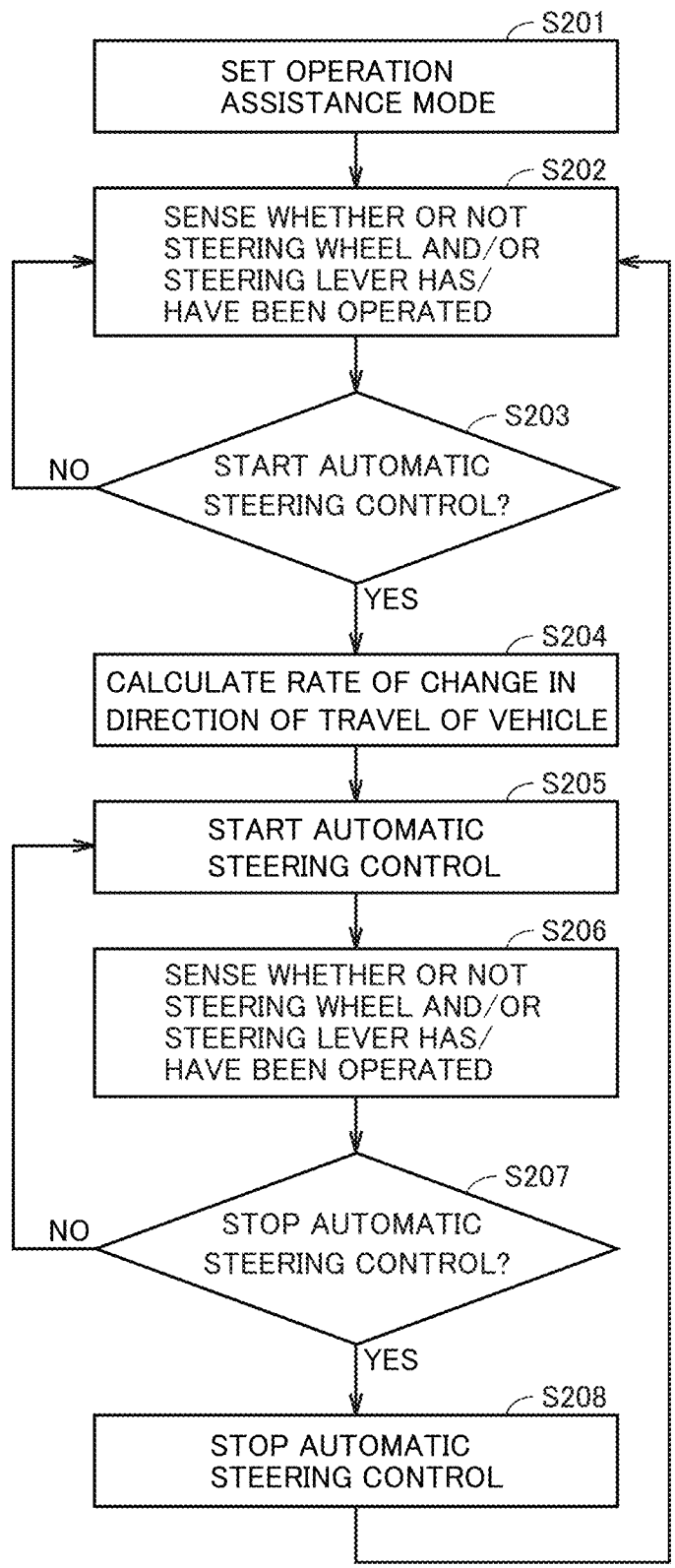
FIG. 9 is a flowchart showing a method of controlling the motor grader.

FIG. 9 is a flowchart showing a method of controlling the motor grader. As shown in FIGS. 4 and 9, initially, control unit 51 is set to an operation assistance mode (S201). The operation assistance mode is set, for example, by turn-on of a mode setting switch provided in cab 11 by an operator.

Then, steering wheel sensor 31 senses whether or not the operator has operated steering wheel 41, and lever sensor 32 senses whether or not the operator has operated steering lever 42 (S202).

In the present step, when steering wheel sensor 31 senses the operation onto steering wheel 41, the steering wheel 41 operation signal is provided to trigger output unit 52, and when steering wheel sensor 31 does not sense the operation onto steering wheel 41, the steering wheel 41 operation signal is not provided to trigger output unit 52. When lever sensor 32 senses the operation onto steering lever 42, the steering lever 42 operation signal is provided to trigger output unit 52, and when lever sensor 32 does not sense the operation onto steering lever 42, the steering lever 42 operation signal is not provided to trigger output unit 52.

Then, automatic control instruction unit 58 determines whether or not to start automatic steering control (S203).

In step S202, when the steering wheel 41 operation signal from steering wheel sensor 31 or the steering lever 42 operation signal from lever sensor 32 is provided to trigger output unit 52, trigger output unit 52 provides the stop trigger to automatic control instruction unit 58. In this case, automatic control instruction unit 58 determines not to start automatic steering control. Then, the process returns to step S202.

In step S202, when the steering wheel 41 operation signal from steering wheel sensor 31 and the steering lever 42 operation signal from lever sensor 32 are not provided to trigger output unit 52, trigger output unit 52 provides the start trigger to automatic control instruction unit 58. In this case, automatic control instruction unit 58 determines to start automatic steering control (S203). Then, the process proceeds to step S204.

Position and direction calculator 59 calculates the position and the orientation of the motor grader based on the acceleration and the angular velocity of the motor grader measured by IMU 38. Rate-of-change calculator 57 calculates the rate of change in the direction of travel per unit travel distance of the motor grader based on the position and the orientation of the motor grader calculated by position and direction calculator 59 (S204). Steering control unit 54 controls steering cylinder 36 to maintain constant, the rate of change in the direction of travel per unit travel distance of the motor grader calculated by rate-of-change calculator 57 (S205).

After step S205 is started, step S206 in which steering wheel sensor 31 senses whether or not the operator has operated steering wheel 41 and lever sensor 32 senses whether or not the operator has operated steering lever 42 and step S207 in which automatic control instruction unit 58 determines whether or not to stop automatic steering control are successively performed. When it is determined in step S207 to stop automatic steering control, steering control unit 54 stops automatic steering control (S208). Thereafter, the process returns to step S202.

Figure 10:
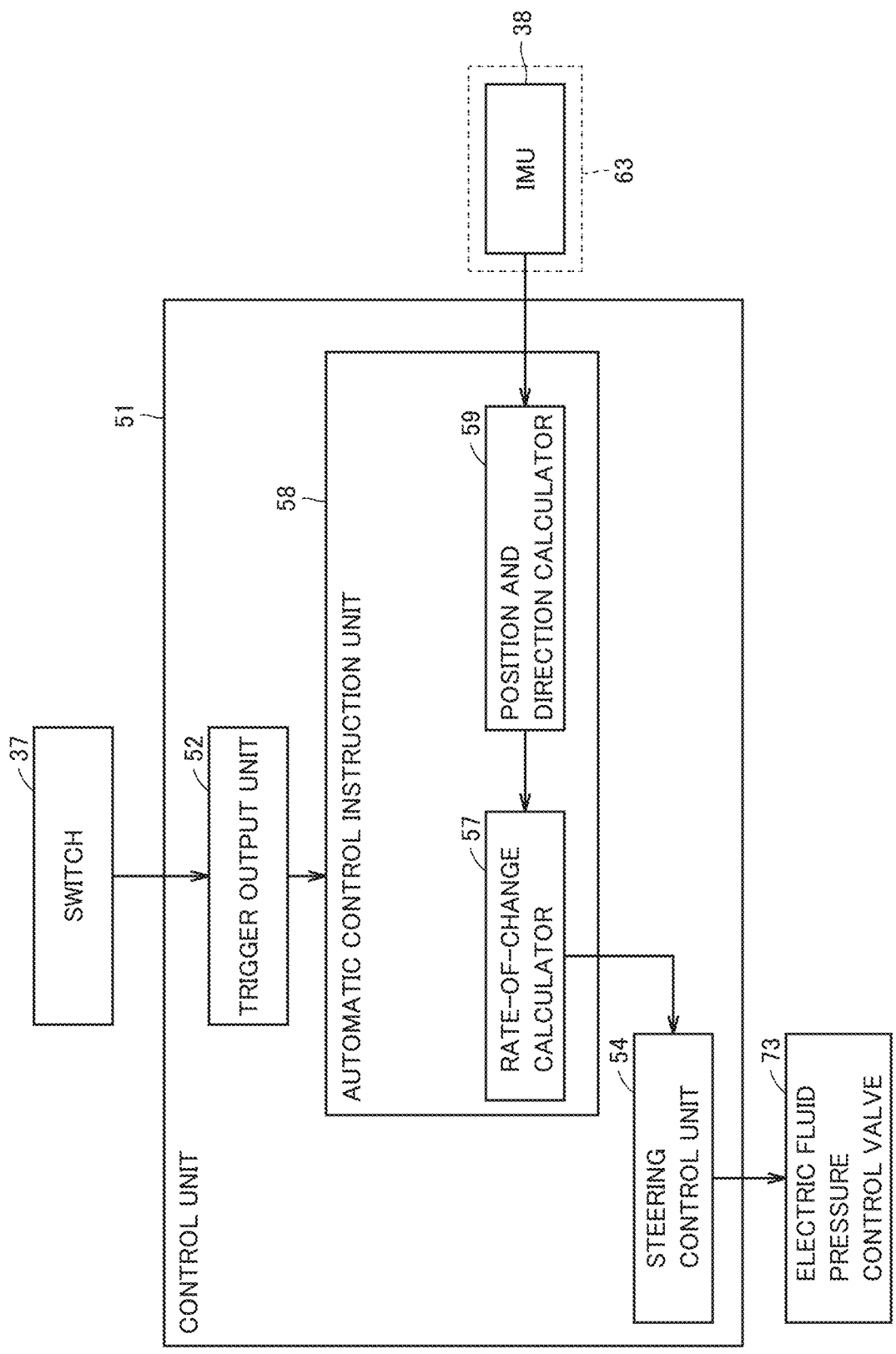
FIG. 10 is a block diagram showing a modification of the configuration involved with the operation assistance system in FIG. 4.

FIG. 10 is a block diagram showing a modification of a configuration involved with the operation assistance system in FIG. 4. As shown in FIG. 10, in the present modification, motor grader 100 includes a switch 37. Switch 37 is a switch for switching between start (on) of automatic steering control and stop (off) of automatic steering control.

Switch 37 is provided in cab 11. A form of switch 37 is not particularly limited, and the switch may be provided as a push button or a lever. Switch 37 may be provided in a touch panel on a monitor.

In the present modification, when the operator performs an operation to turn switch 37 on, a trigger (start trigger) for starting automatic steering control is provided to automatic control instruction unit 58. In succession, the rate of change in the direction of travel per unit travel distance of the motor grader is calculated and automatic steering control is carried out. When the operator performs an operation to turn switch 37 off, the stop trigger is provided to automatic control instruction unit 58 and automatic steering control is stopped.

According to such a configuration, the operator can start automatic steering control at timing further intended by himself/herself.

The configuration and effects of motor grader 100 and a method of controlling the same in the present embodiment described above will be summarized.

Motor grader 100 as the work vehicle includes steering mechanism 66 and control unit 51. Control unit 51 controls steering mechanism 66 to maintain constant, the rate of change in the direction of travel per unit travel distance of motor grader 100.

According to such a configuration, control unit 51 controls steering mechanism 66 to maintain constant, the rate of change in the direction of travel per unit travel distance of motor grader 100, and hence the operator is not required to perform bothersome operations. Therefore, the operation assistance system with which burden imposed on the operator is sufficiently lessened can be realized.

Control unit 51 controls steering mechanism 66 to maintain constant, the rate of change in the direction of travel per unit travel distance of motor grader 100 when a trigger for starting control of steering mechanism 66 is provided.

According to such a configuration, control unit 51 can determine whether or not to start control of steering mechanism 66 based on a predetermined trigger.

Motor grader 100 further includes operation portion 67. Operation portion 67 is operated to move steering mechanism 66. Control unit 51 starts control of steering mechanism 66 when an operation onto operation portion 67 is stopped.

According to such a configuration, since the operation by the operator for starting control of steering mechanism 66 is not required, burden imposed on the operator can further be lessened.

Control unit 51 may start control of steering mechanism 66 after a state in which the operation onto operation portion 67 is stopped continues for a prescribed period.

According to such a configuration, control unit 51 can be prevented from overacting to stop of the operation onto operation portion 67 and starting control of steering mechanism 66.

Control unit 51 stops control of steering mechanism 66 when the operation onto operation portion 67 is resumed.

According to such a configuration, when the operation onto operation portion 67 is resumed, steering mechanism 66 is operated in response to that operation, so that the operator can have motor grader 100 travel in a direction intended by himself/herself.

Motor grader 100 may include switch 37 as a switch that switches between start and stop of control of steering mechanism 66 by control unit 51.

According to such a configuration, the operator can start control of steering mechanism 66 by control unit 51 at timing further intended by himself/herself.

Motor grader 100 further includes sensing unit 63. Sensing unit 63 senses information on at least any one of the position and the orientation of motor grader 100. Control unit 51 specifies the rate of change in the direction of travel per unit travel distance of motor grader 100 based on the information on at least any one of the position and the orientation of motor grader 100 sensed by sensing unit 63.

According to such a configuration, control unit 51 can specify the rate of change in the direction of travel of motor grader 100 based on information on at least any one of the position and the orientation of motor grader 100 sensed by sensing unit 63.

A method of controlling motor grader 100 includes calculating a rate of change in a direction of travel per unit travel distance of motor grader 100 (S204) and controlling steering mechanism 66 to maintain constant, the calculated rate of change in the direction of travel per unit travel distance of motor grader 100 (S205).

The calculating a rate of change (S204) includes calculating the rate of change in the direction of travel per unit travel distance of motor grader 100 when a trigger for starting control of steering mechanism 66 is provided.

According to such a configuration, the operation assistance system with which burden imposed on the operator is sufficiently lessened can be realized.

A gyro sensor, a geomagnetic sensor, or a camera can also be employed as the sensing unit in the present disclosure, without being limited to the IMU. When the camera is employed as the sensing unit in the present disclosure, a position and an orientation of the motor grader can be sensed by analyzing an image of surroundings of the motor grader taken by the camera.

Motor grader 100 further includes as steering mechanism 66 that controls the direction of travel of motor grader 100, a leaning mechanism that laterally leans front wheel 16 and an articulation mechanism that moves front frame 14 and rear frame 15 to form an articulation angle therebetween. Control of steering mechanism 66 by control unit 51 is not limited to automatic steering control for steering cylinder 36. Automatic control of the leaning mechanism, automatic control of the articulation mechanism, or automatic control of mechanisms from among the steering mechanism, the leaning mechanism, and the articulation mechanism may be applicable.

The work vehicle and a method of controlling the same in the present disclosure are applicable, for example, also to various work vehicles such as a wheel loader, a dump truck, or a crawler dozer, without being limited to the motor grader. In application to a wheel loader, the control unit may control an articulation angle between the front frame and the rear frame that are pivotably connected to each other.

Figure 11:
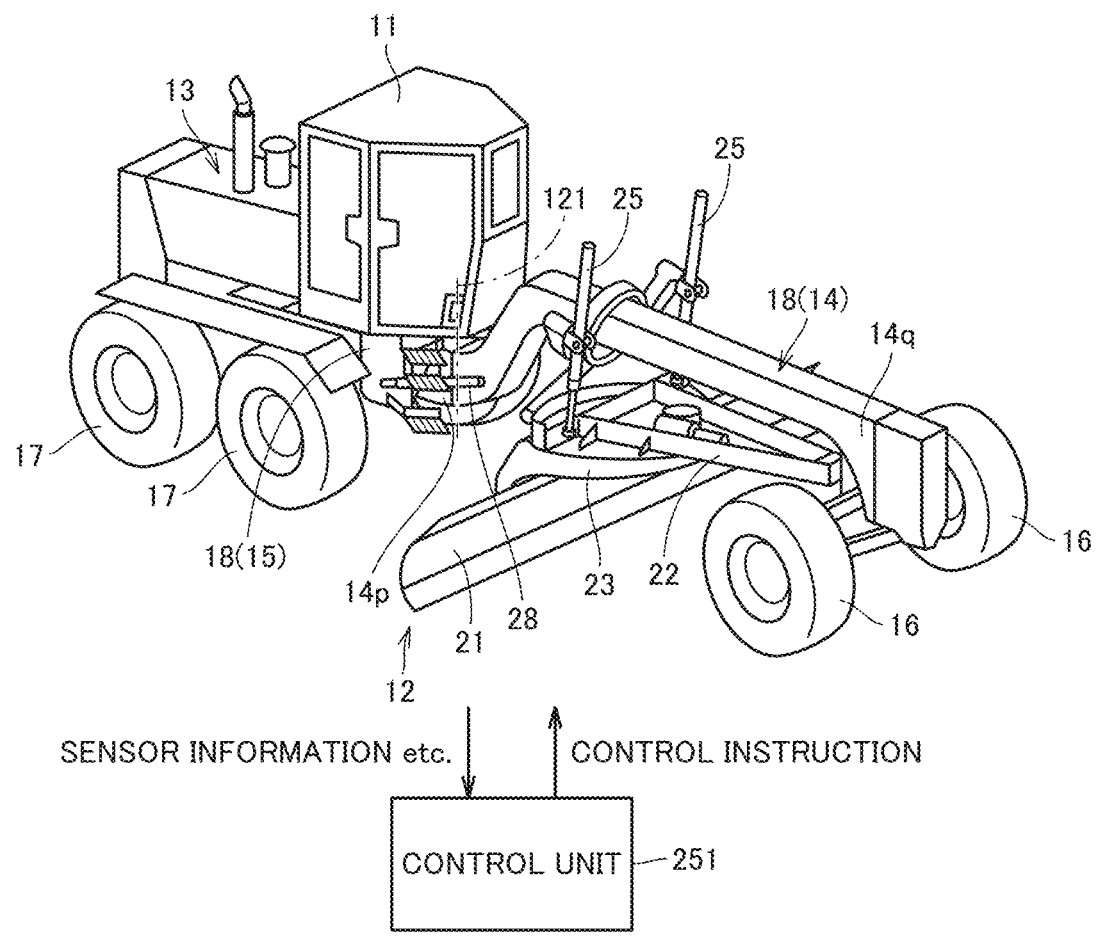
FIG. 11 is a diagram showing a concept of a system for controlling a steering mechanism of the motor grader.

FIG. 11 is a diagram showing a concept of a system for controlling the steering mechanism of the motor grader. Though an example in which motor grader 100 representing the work vehicle includes control unit 51 is described in the embodiment, as shown in FIGS. 3 and 11, steering mechanism 66 of the motor grader may be controlled by a control unit and an operation portion provided at a position distant from the motor grader.

The control system that controls steering mechanism 66 of the motor grader includes a control unit 251 that controls steering mechanism 66 of the motor grader to maintain constant, a rate of change in the direction of travel per unit travel distance of the motor grader.

Second Embodiment

A configuration in an example in which the operation assistance system described in the first embodiment is applied to a crawler dozer will be described in the present embodiment. Description of a redundant configuration as in the first embodiment will not be repeated below.

Figure 12:
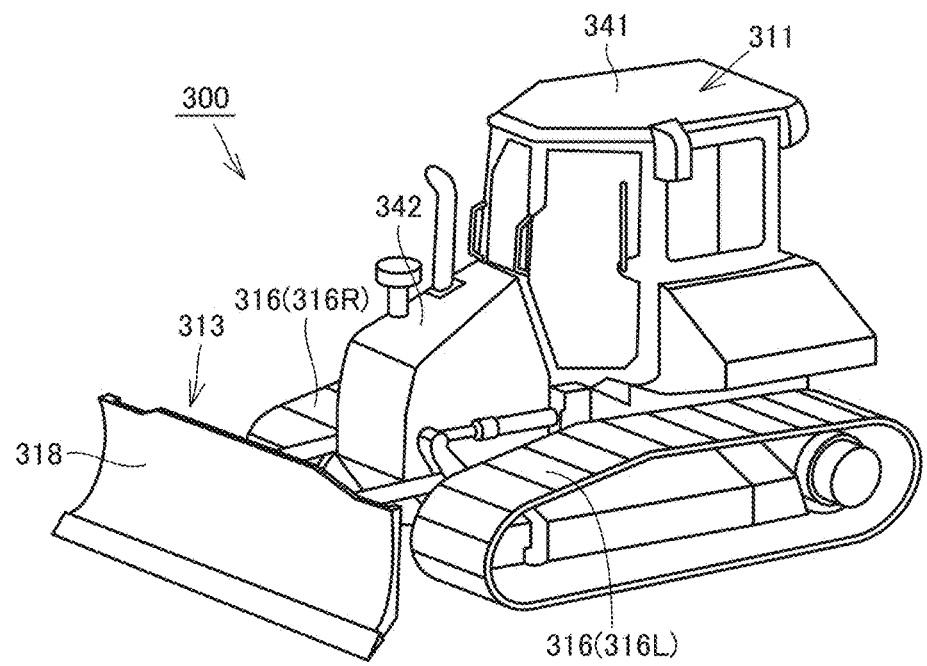
FIG. 12 is a perspective view showing a crawler dozer.
Figure 13:
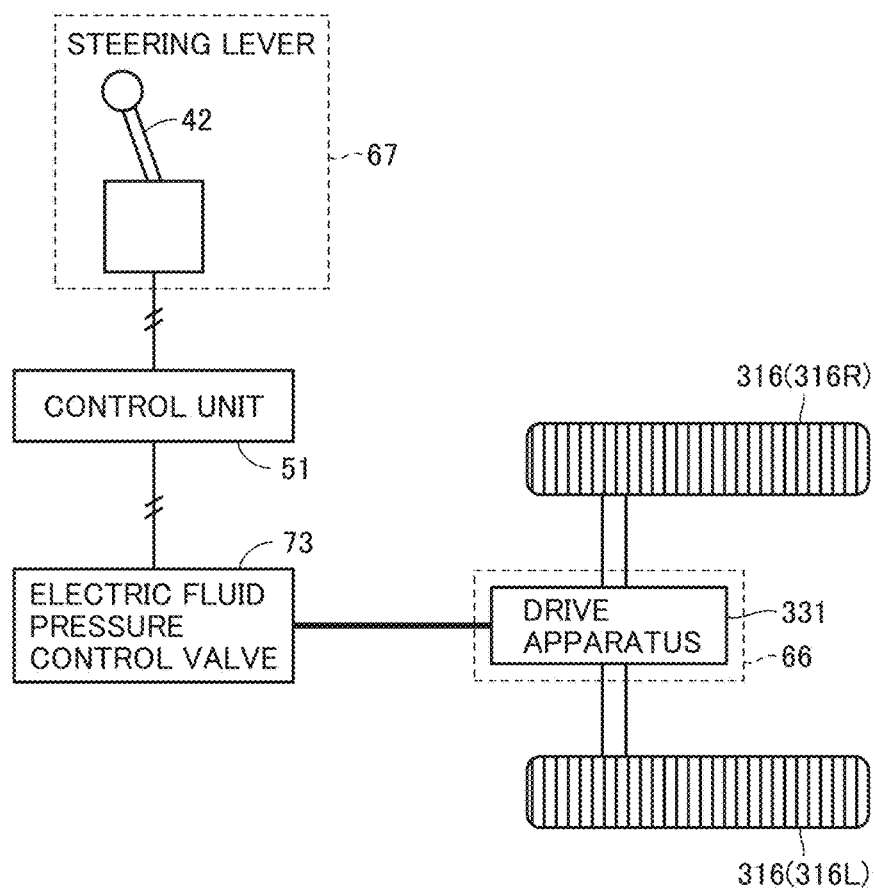
FIG. 13 is a system diagram showing a configuration involved with steering of the crawler dozer in FIG. 12.

FIG. 12 is a perspective view showing a crawler dozer. FIG. 13 is a system diagram showing a configuration involved with steering of the crawler dozer in FIG. 12.

As shown in FIG. 12, a crawler dozer 300 includes a vehicular body 311, a work implement 313, and a pair of left and right tow apparatuses 316 (316R and 316L). Vehicular body 311 is provided on the pair of left and right tow apparatuses 316 (316R and 316L). Vehicular body 311 includes a cab 341 and an engine compartment 342. Work implement 313 is provided in front of vehicular body 311. Work implement 313 includes a blade 318 for doing such works as excavation of soil and land grading.

The pair of left and right tow apparatuses 316 (316R and 316L) is an apparatus for travel of crawler dozer 300. The pair of left and right tow apparatuses 316 (316R and 316L) includes, for example, a crawler belt and a final reduction gear. As the pair of left and right tow apparatuses 316 (316R and 316L) is rotationally driven, crawler dozer 300 travels.

As shown in FIGS. 12 and 13, crawler dozer 300 includes steering mechanism 66, control unit 51, operation portion 67, and electric fluid pressure control valve 73.

Steering mechanism 66 includes a drive apparatus 331. Drive apparatus 331 is a hydraulic motor activated by a hydraulic pressure. Drive apparatus 331 can drive right tow apparatus (first tow apparatus) 316R and left tow apparatus (second tow apparatus) 316L independently of each other.

Operation portion 67 includes steering lever 42. Electric fluid pressure control valve 73 supplies pressure oil to drive apparatus 331. Control unit 51 controls electric fluid pressure control valve 73 based on an operation signal from steering lever 42. Drive apparatus 331 rotates right tow apparatus 316R and left tow apparatus 316L with pressure oil from electric fluid pressure control valve 73. When right tow apparatus 316R and left tow apparatus 316L are equal in rotation speed to each other, crawler dozer 300 travels straight. When right tow apparatus 316R is higher in rotation speed than left tow apparatus 316L, crawler dozer 300 revolves toward forward left. When left tow apparatus 316L is higher in rotation speed than right tow apparatus 316R, crawler dozer 300 revolves toward forward right.

Figure 14:
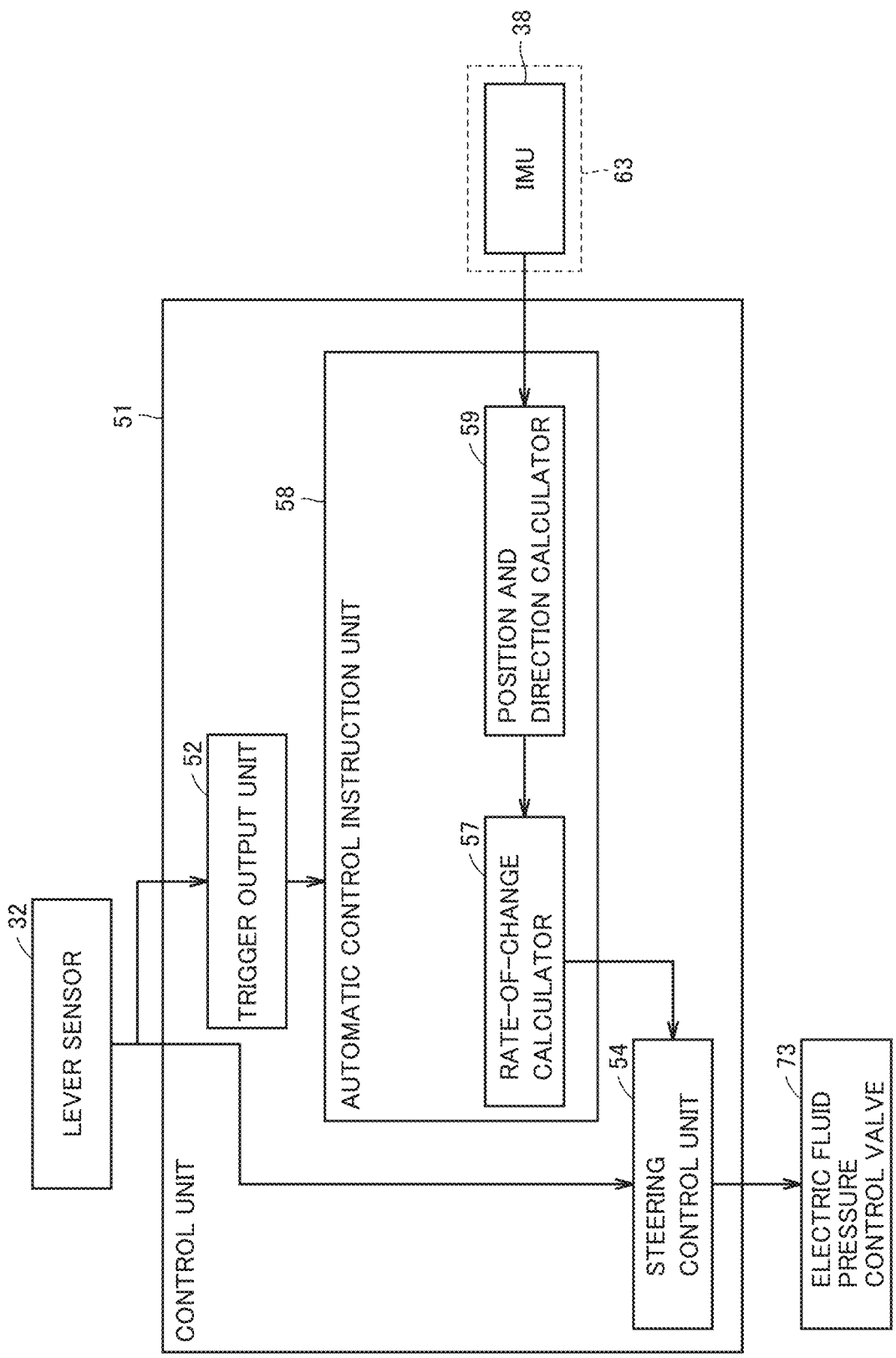
FIG. 14 is a block diagram showing a configuration involved with the operation assistance system of the crawler dozer in FIG. 12.

FIG. 14 is a block diagram showing a configuration involved with the operation assistance system of the crawler dozer in FIG. 12. As shown in FIGS. 13 and 14, crawler dozer 300 includes lever sensor 32. Lever sensor 32 senses an operation onto steering lever 42.

Crawler dozer 300 further includes sensing unit 63. Sensing unit 63 senses information on at least any one of a position and an orientation of crawler dozer 300. Sensing unit 63 includes IMU 38. IMU 38 is a sensor that measures an acceleration and an angular velocity of crawler dozer 300. IMU 38 provides a signal indicating the acceleration and the angular velocity of crawler dozer 300 to control unit 51.

As shown in FIG. 14, control unit 51 includes trigger output unit 52, automatic control instruction unit 58, and steering control unit 54.

Trigger output unit 52 provides a trigger for starting or stopping control of steering mechanism 66 based on a steering lever 42 operation signal from lever sensor 32.

Automatic control instruction unit 58 includes position and direction calculator 59 and rate-of-change-in-travel-direction calculator 57.

Position and direction calculator 59 receives input of a signal indicating an acceleration and an angular velocity of crawler dozer 300 sensed by IMU 38. Position and direction calculator 59 calculates the position and the orientation of crawler dozer 300 based on the acceleration and the angular velocity of crawler dozer 300 measured by IMU 38 and provides a signal indicating the calculated position and orientation of crawler dozer 300 to rate-of-change calculator 57.

Rate-of-change calculator 57 receives input of the signal indicating the position and the orientation of crawler dozer 300 calculated by position and direction calculator 59. Rate-of-change calculator 57 calculates the rate of change in the direction of travel per unit travel distance of crawler dozer 300 based on the position and the orientation of crawler dozer 300 calculated by position and direction calculator 59.

Steering control unit 54 controls steering mechanism 66 to maintain constant, the rate of change in the direction of travel per unit travel distance of crawler dozer 300 calculated by rate-of-change calculator 57. Specifically, steering control unit 54 provides a control signal to electric fluid pressure control valve 73 to maintain constant, the rate of change in the direction of travel per unit travel distance of crawler dozer 300 calculated by rate-of-change calculator 57. Electric fluid pressure control valve 73 supplies pressure oil to drive apparatus 331 based on a signal from steering control unit 54 and controls the rotation speed of right tow apparatus 316R and the rotation speed of left tow apparatus 316L.

According to crawler dozer 300 thus constructed, effects described in the first embodiment can similarly be achieved.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

11, 341 cab; 12, 313 work implement; 13, 342 engine compartment; 14 front frame; 14p base end; 14q tip end; 15 rear frame; 16 front wheel; 17 rear wheel; 18 vehicular body frame; 21, 318 blade; 22 draw bar; 23 swing circle; 25 lift cylinder; 28 articulation cylinder; 31 steering wheel sensor; 32 lever sensor; 36 steering cylinder; 37 switch; 41 steering wheel; 42 steering lever; 51, 251 control unit; 52 trigger output unit; 54 steering control unit; 57 rate-of-change calculator; 58 automatic control instruction unit; 59 direction calculator; 63 sensing unit; 66 steering mechanism; 67 operation portion; 71 orbital valve; 72 steering valve; 73 electric fluid pressure control valve; 100 motor grader; 121 pivot center; 160 deposit; 300 crawler dozer; 311 vehicular body; 316, 316L, 316R tow apparatus; 331 drive apparatus

The invention claimed is:

1. A control system that controls a steering mechanism of a work vehicle, the control system comprising:
a control unit that:
receives, from a sensor on the work vehicle, an acceleration and an angular velocity of the work vehicle,
calculates a position and an orientation of the work vehicle based on the received acceleration and the received angular velocity of the work vehicle,
calculates a rate of change in a direction of travel per unit travel distance of the work vehicle based on the calculated position of the work vehicle and the calculated orientation of the work vehicle when a trigger for starting control of the steering mechanism of the work vehicle is provided, and
controls the steering mechanism of the work vehicle such that the calculated rate of change in the direction of travel per unit travel distance of the work vehicle is maintained constant.

2. The control system according to claim 1, further comprising an operation portion operated to move the steering mechanism of the work vehicle, wherein
the control unit starts control of the steering mechanism of the work vehicle when an operation onto the operation portion is stopped.

3. The control system according to claim 2, wherein
the control unit starts control of the steering mechanism of the work vehicle after a state in which the operation onto the operation portion is stopped continues for a prescribed period.

4. The control system according to claim 2, wherein
the control unit stops control of the steering mechanism of the work vehicle when the operation onto the operation portion is resumed.

5. The control system according to claim 1, further comprising a switch that switches between start and stop of control of the steering mechanism of the work vehicle by the control unit.

6. A method of controlling a work vehicle including a steering mechanism, the method comprising:
receiving, from a sensor on the work vehicle, an acceleration and an angular velocity of the work vehicle;
calculating a position and an orientation of the work vehicle based on the received acceleration and the received angular velocity of the work vehicle;
calculating a rate of change in a direction of travel per unit travel distance of the work vehicle based on the calculated position of the work vehicle and the calculated orientation of the work vehicle when a trigger for starting control of the steering mechanism of the work vehicle is provided; and
controlling the steering mechanism such that the calculated rate of change in the direction of travel per unit travel distance of the work vehicle is maintained constant.

7. The method of controlling a work vehicle according to claim 6, wherein
the steering mechanism includes a steering cylinder and a steering valve for controlling the steering cylinder, and
the steering cylinder moves a steerable wheel to change an angle formed by the steerable wheel with respect to a fore/aft direction by pressure oil from the steering valve.

8. The method of controlling a work vehicle according to claim 6, wherein
the steering mechanism includes a drive apparatus that rotationally drives a pair of a first tow apparatus and a second tow apparatus located on left and right sides, and the drive apparatus controls a rotation speed of the first tow apparatus and a rotation speed of the second tow apparatus independently of each other.

9. A work vehicle comprising:
a steering mechanism; and
a control unit that:
  receiving, from a sensor on the work vehicle, an acceleration and an angular velocity of the work vehicle,
  calculates a position and an orientation of the work vehicle based on the received acceleration and the received angular velocity of the work vehicle,
  calculates a rate of change in a direction of travel per unit travel distance of the work vehicle based on the calculated position of the work vehicle and the calculated orientation of the work vehicle when a trigger for starting control of the steering mechanism of the work vehicle is provided, and
  controls the steering mechanism such that the calculated rate of change in the direction of travel per unit travel distance of the work vehicle is maintained constant.

10. The work vehicle according to claim 9, further comprising an operation portion operated to move the steering mechanism, wherein
the control unit starts control of the steering mechanism when an operation onto the operation portion is stopped.

11. The work vehicle according to claim 10, wherein
the control unit starts control of the steering mechanism after a state in which the operation onto the operation portion is stopped continues for a prescribed period.

12. The work vehicle according to claim 10, wherein
the control unit stops control of the steering mechanism when the operation onto the operation portion is resumed.

13. The work vehicle according to claim 9, further comprising a switch that switches between start and stop of control of the steering mechanism by the control unit.

14. The work vehicle according to claim 9, wherein
the steering mechanism includes a steering cylinder and a steering valve for controlling the steering cylinder, and
the steering cylinder moves a steerable wheel to change an angle formed by the steerable wheel with respect to a fore/aft direction by pressure oil from the steering valve.

15. The work vehicle according to claim 9, wherein
the steering mechanism includes a drive apparatus that rotationally drives a pair of a first tow apparatus and a second tow apparatus located on left and right sides, and
the drive apparatus controls a rotation speed of the first tow apparatus and a rotation speed of the second tow apparatus independently of each other.

\* \* \* \* \*